US011761838B2

(12) United States Patent
Konvalina et al.

(10) Patent No.: US 11,761,838 B2
(45) Date of Patent: Sep. 19, 2023

(54) SENSING USING NANOPARTICLE BASED STRAIN SENSORS

(71) Applicant: FEELIT TECHNOLOGIES LTD., Haifa (IL)

(72) Inventors: Gady Konvalina, Haifa (IL); Meital Segev Bar, Yokneam Ilit (IL); Oded Shlomo Kraft-Oz, Haifa (IL); Amit Levy-Yamamori, Haifa (IL)

(73) Assignee: FEELIT TECHNOLOGIES LTD., Haifa (IL)

(*) Notice: Subject to any disclaimer, the term of this patent is extended or adjusted under 35 U.S.C. 154(b) by 194 days.

(21) Appl. No.: 16/771,260

(22) PCT Filed: Dec. 11, 2018

(86) PCT No.: PCT/IB2018/059854
§ 371 (c)(1),
(2) Date: Jun. 10, 2020

(87) PCT Pub. No.: WO2019/116212
PCT Pub. Date: Jun. 20, 2019

(65) Prior Publication Data
US 2021/0372874 A1 Dec. 2, 2021

Related U.S. Application Data

(60) Provisional application No. 62/596,943, filed on Dec. 11, 2017.

(51) Int. Cl.
*G01L 9/02* (2006.01)
*G01L 9/00* (2006.01)
(Continued)

(52) U.S. Cl.
CPC .............. *G01L 9/0027* (2013.01); *G01B 7/06* (2013.01); *G01M 3/2853* (2013.01)

(58) Field of Classification Search
CPC ........ G01B 7/02–107; G01B 5/02–068; G01L 1/16–2293; G01M 3/02; G01M 3/36–366
See application file for complete search history.

(56) References Cited

U.S. PATENT DOCUMENTS 8,931,520 B2 * 1/2015 Fernald .................. G01F 15/006
138/104
9,164,009 B2 10/2015 Mouchel La Fosse et al.
(Continued)

FOREIGN PATENT DOCUMENTS

EP 1944583 A1 7/2008
EP 3270122 A1 1/2018
(Continued)

OTHER PUBLICATIONS

Sadeghioon et al., (2014) SmartPipes: Smart Wireless Sensor Networks for Leak Detection in Water Pipelines. J Sens Actuator Netw 3(1): 64-78 (15 pages).
(Continued)

*Primary Examiner* — Alexander A Mercado
(74) *Attorney, Agent, or Firm* — ROACH, BROWN, MCCARTHY & GRUBER, P.C.; Kevin D. McCarthy

(57) ABSTRACT

A method for determining a fluid pressure parameter related to a fluid located within a fluid conduit, the method may include measuring one or more resistances of one or more nanoparticle based sensing elements to provide sensed information; wherein the one or more nanoparticle based sensing elements comprise nanometric particles having an electrical resistance that is responsive to at least one out of pressure and temperature; wherein the one or more nanoparticle based sensing elements are printed between conductive electrodes, wherein the conductive electrodes are either printed on an exterior of the fluid conduit or are formed on a substrate that is attached to the exterior of the fluid conduit;

(Continued)

and determining, based on the sensed information, the fluid pressure parameter.

12 Claims, 16 Drawing Sheets

(51) Int. Cl.
*G01B 7/06* (2006.01)
*G01M 3/28* (2006.01)

(56) References Cited

U.S. PATENT DOCUMENTS

| | | | | |
|---|---|---|---|---|
| 9,562,814 | B2* | 2/2017 | Kulkarni | G01L 1/2287 |
| 9,625,341 | B2* | 4/2017 | Haick | G01N 27/121 |
| 9,632,050 | B2* | 4/2017 | Zhong | G01N 27/127 |
| 2005/0166414 | A1* | 8/2005 | Lum | G01B 7/063 |
| | | | | 33/550 |
| 2006/0253942 | A1* | 11/2006 | Barrera | G01L 1/2287 |
| | | | | 977/852 |
| 2013/0018611 | A1* | 1/2013 | Sturmer | B01L 3/502792 |
| | | | | 702/65 |
| 2013/0228018 | A1* | 9/2013 | Mouchel La Fosse | |
| | | | | A61B 5/6876 |
| | | | | 73/753 |
| 2014/0360279 | A1* | 12/2014 | Jenkins | G01L 1/22 |
| | | | | 73/756 |
| 2016/0138997 | A1* | 5/2016 | Zhu | G08B 21/182 |
| | | | | 340/626 |
| 2017/0281006 | A1* | 10/2017 | Aho | G01L 1/16 |
| 2018/0067003 | A1* | 3/2018 | Michiwaki | G01M 5/0083 |
| 2018/0209829 | A1 | 7/2018 | Makino et al. | |
| 2018/0274956 | A1 | 9/2018 | Miller et al. | |
| 2019/0195398 | A1* | 6/2019 | Nüssen | F16L 11/1185 |
| 2019/0265015 | A1* | 8/2019 | Michiwaki | G01B 7/16 |
| 2019/0353541 | A1* | 11/2019 | Shapiro | G01L 1/2287 |
| 2020/0011169 | A1* | 1/2020 | Haghshenas | G01B 5/20 |
| 2020/0025699 | A1* | 1/2020 | Yeo | A61B 5/02108 |
| 2020/0264084 | A1* | 8/2020 | Wiens | G01N 3/30 |
| 2020/0300599 | A1* | 9/2020 | Andrews | B60C 25/007 |

FOREIGN PATENT DOCUMENTS

| | | |
|---|---|---|
| WO | 2004053464 A1 | 6/2004 |
| WO | 2017114978 A1 | 7/2017 |

OTHER PUBLICATIONS

Zhang (2017) Analysis on the effect of venturi tube structural parameters on fluid flow. AIP Advances 7: 065315; 10 pages.
What is a Pneumatic Actuator? Retrieved from: https://instrumentationtools.com/what-is-a-pneumatic-actuator/ on Dec. 13, 2020. 9 pages—according to the Wayback machine (https://web.archive.org/web/2017*/https://instrumentationtools.com/what-is-a-pneumatic-actuator/) this website was last saved on Nov. 12, 2017.

* cited by examiner

92

93

110

121

122

131

133

132

134

140

SENSING USING NANOPARTICLE BASED STRAIN SENSORS

CROSS REFERENCE

This application claims priority from U.S. provisional patent 62/596,943 Dec. 11, 2017 which incorporated herein by reference.

BACKGROUND

Pressure vessels are widely used in many fields, such as chemical plants, power stations, irrigation and watering systems, oil and gas systems, etc. In many cases, pressure vessels are safety critical because they contain flammable, explosive, virulent, or corrosive materials. Accidents due to explosion and leakage of the contents will lead to serious consequences, and high pressure is one of the most identified causes leading to these kinds of accidents. In addition, pressure vessels play an important role in protecting the environment, external or internal, from pollution resulting from leakage and are important in preventing financial waste.

Therefore, it becomes critically important to measure the pressure of these vessels in an accurate and convenient manner.

It is very common for pressure to be measured by pressure gauges located within the vessel, in which case the gauges are in direct contact with the materials contained. However, it is not always applicable or cost-effective to mount such pressure gauges. For example, sometimes it will require upgrading a lot of the installed equipment, or the installation of gauges will change the integrity of the vessel, which may lead to other safety issues. Furthermore, in some cases, the material of the pressure gauge may be incompatible with the material contained, for example, when sterile conditions are required or special regulations apply.

Another approach for measuring the pressure within a vessel is a non-invasive approach. There are several proposed methods for this approach, such as the strain gauge method, the capacitor method and the ultrasonic method. These methods can solve some problems, but there is still room for improvement in terms of the accuracy and sensitivity, simplicity of calculation, sensors pricing and, as a consequence, the dispersion of sensors, sensors size and thickness. For example, the accuracy of the strain gauge method is heavily affected by the environment—particularly the temperature and humidity. In another example, capacitor method is only applicable for small-diameter pressure vessels, and its accuracy is sensitive to the type of medium inside the pressure vessel and the environment.

The biotechnology industry requires accurate measurement of pressure within pressure vessels, such as pipe lines, for process control while maintaining absolute sterile conditions as well as the ability to perform disinfection. Processing biomaterials is usually done in small batches; therefore, pipe size can be very small, typically ½" or ¾" in diameter. For these use case, sensors that are adhered or printed on the pipes need to be highly flexible and non-intrusive.

Limitations of the known solutions to the problem

Conventional strain gauges (e.g., metallic strain gauges) have low sensitivity (gauge factor=2) and therefore are not suitable for high resolution pressure sensors. Force sensitive resistors (FSR) are mainly sensitive to perpendicular pressures. In order to measure strains from a pipe with a FSR a ring configuration must be applied to induce perpendicular strains. This configuration is not optimal for pressure sensing in a tube since the strains induced by the fluid within the vessel on the tube/pipe/vessel are lateral and therefor the pipe strain is measured indirectly. The indirect measurement lowers the accuracy and sensitivity of the measurement. In addition, these sensors have a nonlinear response to strain and environmental parameters like temperature and humidity might affect the accuracy of the above mentioned examples.

SUMMARY

There may be provided systems and methods as illustrated in any part of the patent application.

There may be provided a sensing device that may include a processor, one or more nanoparticle based sensing elements, conductive electrodes coupled between the processor and the one or more nanoparticle based sensing elements, wherein the sensing device is configured to (a) measure one or more resistances of the one or more nanoparticle based sensing elements to provide sensed information; wherein the one or more nanoparticle based sensing elements may include nanometric particles having an electrical resistance that is responsive to at least one out of pressure and temperature; wherein the one or more nanoparticle based sensing elements are printed between the conductive electrodes, wherein the conductive electrodes are either printed on an exterior of a fluid conduit or are formed on a substrate that is attached to the exterior of the fluid conduit; and (b) determine, based on the sensed information, the fluid pressure parameter of a fluid within the fluid conduit.

There may be provided a sensing device that may include a processor, one or more nanoparticle based sensing elements, conductive electrodes coupled between the processor and the one or more nanoparticle based sensing elements, wherein the sensing device is configured to (a) measure one or more resistances of the one or more nanoparticle based sensing elements to provide sensed information; wherein the one or more nanoparticle based sensing elements may include nanometric particles having an electrical resistance that is responsive to at least one out of pressure and temperature; wherein the one or more nanoparticle based sensing elements are printed between the conductive electrodes, wherein the conductive electrodes are either printed on an exterior of an object or are formed on a substrate that is attached to the exterior of the object; and (b) determine, based on the sensed information, an object temperature parameter.

There may be provided a sensing device that may include a processor, one or more nanoparticle based sensing elements, conductive electrodes coupled between the processor and the one or more nanoparticle based sensing elements, wherein the sensing device is configured to (a) measure one or more resistances of the one or more nanoparticle based sensing elements to provide sensed information; wherein the one or more nanoparticle based sensing elements may include nanometric particles having an electrical resistance that is responsive to at least one out of pressure and temperature; wherein the one or more nanoparticle based sensing elements are printed between the conductive electrodes, wherein the conductive electrodes are either printed on an exterior of an object that may include a moving mechanical element or are formed on a substrate that is attached to the exterior of the object; wherein the object may include a movable mechanical element; and (b) determine, based on the sensed information, movement related parameter.

There may be provided a sensing device that may include a processor, one or more nanoparticle based sensing elements, conductive electrodes coupled between the processor and the one or more nanoparticle based sensing elements, wherein the sensing device is configured to (a) measure one or more resistances of the one or more nanoparticle based sensing elements to provide sensed information; wherein the one or more nanoparticle based sensing elements may include nanometric particles having an electrical resistance that is responsive to at least one out of pressure and temperature; wherein the one or more nanoparticle based sensing elements are printed between the conductive electrodes, wherein the conductive electrodes are either printed on an area of an exterior of a fluid conduit or are formed on a substrate that is attached to the area; and (b) determine, based on the sensed information, a thickness parameter regarding a thickness of the area.

There may be provided a sensing device that may include a processor, one or more nanoparticle based sensing elements, conductive electrodes coupled between the processor and the one or more nanoparticle based sensing elements, wherein the sensing device is configured to (a) measure one or more resistances of the one or more nanoparticle based sensing elements to provide sensed information; wherein the one or more nanoparticle based sensing elements may include nanometric particles having an electrical resistance that is responsive to at least one out of pressure and temperature; wherein the one or more nanoparticle based sensing elements are printed between the conductive electrodes, wherein the conductive electrodes are either printed on an object through which a bolt passes or are formed on the object; and (b) determine, based on the sensed information, a bolt status parameter that is indicative of the tightness of the bolt.

There may be provided a method for monitoring a bolt status, the method may include measuring one or more resistances of one or more nanoparticle based sensing elements to provide sensed information; wherein the one or more nanoparticle based sensing elements may include nanometric particles having an electrical resistance that is responsive to at least one out of pressure and temperature; wherein the one or more nanoparticle based sensing elements are printed between conductive electrodes, wherein the conductive electrodes are either printed on an object through which the bolt passes or are formed on the object; and determining, based on the sensed information, a bolt status parameter that is indicative of the tightness of the bolt.

There may be provided a method for determining a thickness parameter, the method may include measuring one or more resistances of one or more nanoparticle based sensing elements to provide sensed information; wherein the one or more nanoparticle based sensing elements may include nanometric particles having an electrical resistance that is responsive to at least one out of pressure and temperature; wherein the one or more nanoparticle based sensing elements are printed between conductive electrodes, wherein the conductive electrodes are either printed on an area of an exterior of a fluid conduit or are formed on a substrate that is attached to the area; and determining, based on the sensed information, the thickness parameter regarding a thickness of the area.

There may be provided a method for monitoring an object that may include a movable mechanical element, the method may include measuring one or more resistances of one or more nanoparticle based sensing elements to provide sensed information; wherein the one or more nanoparticle based sensing elements may include nanometric particles having an electrical resistance that is responsive to at least one out of pressure and temperature; wherein the one or more nanoparticle based sensing elements are printed between conductive electrodes, wherein the conductive electrodes are either printed on an exterior of the object or are formed on a substrate that is attached to the exterior of the object; wherein the object may include a movable mechanical element; and determining, based on the sensed information, a movement related parameter.

There may be provided a method for thermal monitoring of an object, the method may include measuring one or more resistances of one or more nanoparticle based sensing elements to provide sensed information; wherein the one or more nanoparticle based sensing elements may include nanometric particles having an electrical resistance that is responsive to at least one out of pressure and temperature; wherein the one or more nanoparticle based sensing elements are printed between conductive electrodes, wherein the conductive electrodes are either printed on an exterior of the object or are formed on a substrate that is attached to the exterior of the object; and determining, based on the sensed information, an object temperature parameter.

There may be provided a method for determining a fluid pressure parameter related to a fluid located within a fluid conduit, the method may include measuring one or more resistances of one or more nanoparticle based sensing elements to provide sensed information; wherein the one or more nanoparticle based sensing elements may include nanometric particles having an electrical resistance that is responsive to at least one out of pressure and temperature; wherein the one or more nanoparticle based sensing elements are printed between conductive electrodes, wherein the conductive electrodes are either printed on an exterior of the fluid conduit or are formed on a substrate that is attached to the exterior of the fluid conduit; and determining, based on the sensed information, the fluid pressure parameter.

BRIEF DESCRIPTION OF THE DRAWINGS

The embodiments of the disclosure will be understood and appreciated more fully from the following detailed description, taken in conjunction with the drawings in which.

DETAILED DESCRIPTION OF THE DRAWINGS

Figure 1A:
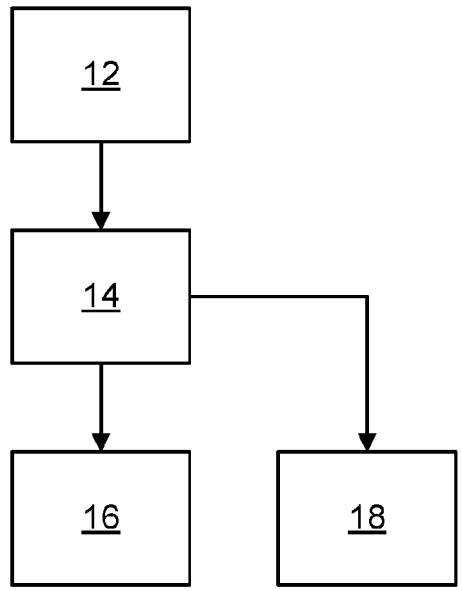
FIGS. 1A, 1B, 2A, 2B, 3 and 4 are examples of methods.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

The terms "including", "comprising", "having", "consisting" and "consisting essentially of" are used in an interchangeable manner.

Pressure and strain are used in an interchangeable manner.

There are provided examples of a pressure sensor. Methods for manufacturing the pressure sensor and method for sensing pressure using the pressure sensor.

The following example are non-limiting examples. For example—the nanoparticle ink may be printed in various patterns and be attached directly or indirectly to a conduit to be measured. The various materials mentioned below are merely non-limiting examples of materials. The same applied to any manufacturing parameter such as temperature, manufacturing method, and the like.

There is provided a device that uses nanoparticle sensors printed on or adhered to the outer or inner surface of a conduit (such as a tube/pipe/vessel) to measure the lateral strains associated with pressure changes of the fluid within the tube/pipe/vessel. The high sensitivity of the nanoparticles based sensors and wide dynamic range enable detection of very small pressure changes (which is not possible with current strain sensing technologies) over a wide range of pressures without the need for additional elements (such as a ring configuration in the case of FSRs). The change in the measured property (e.g., electrical resistance) is determined be the change in the inter particle distance between the nanoparticles which is highly affected with substrate strains (e.g., lateral strain). The nanoparticles (e.g., gold) are encapsulated with organic ligand to ensure long time stability. The thin film configuration of the nanoparticle sensors eliminates delamination of the sensors from the surface of the vessel which results from either shear stresses induced by lateral strains associated with the pressure changes and/or normal stresses induced by the elastic bending force of the sensor in the case of curved surfaces. Eliminating delamination of the sensors is especially important in the case of small diameter tubes/pipes where such stresses are high.

There is provided a pressure sensor for measuring pressure and pressure changes. The pressure sensor includes one or nanoparticle ink patterns. The nanoparticles ink may be printed over and/or between conductive electrodes to form a piezo-resistive pressure sensor in a manner that makes the sensor sensitive not only to normal forces but also to lateral forces. The nanoparticles ink should form one or more patterns.

A pattern printed between a pair of conductive electrodes should be electrically coupled to the pair of conductive electrodes.

The electrical coupling may be obtained with or without printing any part of the pattern on one or more conductive electrodes of the pair.

The pattern may be coupled to more than a pair of conductive electrodes.

Multiple patterns may be coupled to a pair of conductive electrodes.

Any of the mentioned below relationships may be learnt during a learning period in which sensed information is acquired and parameters or information to be deducted by any of the mentioned above methods is also learnt or provided from another source.

The term "parameter" means any type of information.

Any parameter mentioned below may mean:

a. a value.
b. a change of value.
c. a pattern of values over time.
d. a difference in values.
e. a deviation of a value from an expected/allowable/tolerable value.
f. an event represented by the value.
g. a deviation of a change of value from an expected/allowable/tolerable change of value.
h. a deviation of a pattern of values over time from an expected/allowable/tolerable pattern of values over time.
i. a deviation of a difference in values from an expected/allowable/tolerable a difference in values,
j. Or any combinations of (a)-(i).

These mentioned above example are applicable to any of the mentioned below parameters—such as a fluid pressure parameter, a thickness parameter, a movement related parameter, a bolt status parameter, and the like.

For example, a fluid pressure parameter is related to a fluid within a conduit and may be indicative of at least one out of a level of pressure, a change of the pressure over time, a difference in fluid pressure values, a deviation of a fluid pressure from an expected/allowable/tolerable value, an related fluid event (such as a blockage of fluid, a partial blockage of fluid, excess fluid pressure, a fluid leakage), a deviation of a change of fluid pressure from an expected/allowable/tolerable change of fluid pressure, a deviation of a pattern of fluid pressure over time from an expected/allowable/tolerable pattern of fluid pressure over time, a deviation of a difference in fluid pressures from an expected/allowable/tolerable a difference in fluid pressures, or any combinations of the above.

Any of the mentioned below method involves using one or more nanoparticle based sensing elements. The one or more based sensing elements include nanometric particles that have a resistance that may be responsive to a temperature and/or pressure. The nanometric particles may be piezoresistive particles. The nanometric piezoresistive particles may be nanometric gold particles- or any other nanometric piezoresistive particles.

The one or more nanoparticle based sensing elements may be printed between conductive electrodes to form one or more conductive paths between conductive electrodes. The nanometric particles may form nanometric patterns. A nanometric pattern that is formed between a pair of conductive electrodes allows to measure the resistance of the nanometric pattern—which represents at least one out of temperature and pressure imposed on the nanometric pattern. A nanometric pattern is made of nanometric particles but may have a size (pattern over all size) that is of millimetric scale or any other non-nanometric scale.

The conductive electrodes may be printed or otherwise formed on an object of interest.

Alternatively, the conductive electrodes may be printed or otherwise formed on a substrate (that may or may not be flexible) that in turn is connected/attached/glued to the object of interest.

The thickness of the flexible substrate and/or the combination of the conductive electrodes and the sensing elements may be of millimetric scale and even micron scale (for example—between a fraction of a millimeter (even below 10-50 microns) and 10-50 millimeters).

The nanoparticle based sensing elements may form a three dimensional array of nanoparticle based sensing elements—but may be arranged in any other manner.

FIG. 1A illustrates method 10 for determining a fluid pressure parameter related to a fluid located within a fluid conduit.

Method 10 may include step 12 of receiving or learning a relationship between values of the sensed information and values of the fluid pressure parameter. The learning may be involve performing, during a learning period, multiple repetition of step 14, while also learning or estimating the values of the fluid pressure parameter Step 12 may be followed by step 14 of measuring one or more resistances of one or more nanoparticle based sensing elements to provide sensed information. The one or more nanoparticle based sensing elements include nanometric particles having an electrical resistance that is responsive to at least one out of pressure and temperature. The one or more nanoparticle based sensing elements are printed between conductive electrodes. The conductive electrodes may be printed on an exterior of the fluid conduit or may be formed on a substrate that may be attached to the exterior of the fluid conduit.

Step 14 may be followed by step 16 of determining, based on the sensed information, the fluid pressure parameter.

Step 16 may be based on the relationship.

Method 10 may also involve step 18 of determining, based on the sensed information, thickness variation of the conduit, and/or a thickness of a conduit and a change over time of a thickness the conduit.

Step 18 may be based on relationship between values of the sensed information and values of thickness of the conduit. The relationship may be receiver or learnt during a learning period (such as step 12).

Figure 1B:
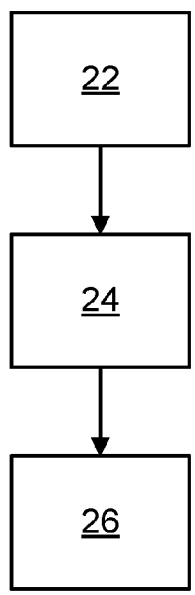

FIG. 1B illustrates method 20 for thermal monitoring.

Method 20 may include step 22 of receiving or learning a relationship between values of the sensed information and values of the object temperature parameter. The learning may be involve performing, during a learning period, multiple repetition of step 24, while also learning or estimating the values of the object temperature parameter.

Step 22 may be followed by step 24 of measuring one or more resistances of one or more nanoparticle based sensing elements to provide sensed information. The one or more nanoparticle based sensing elements include nanometric particles having an electrical resistance that is responsive to at least one out of pressure and temperature. The one or more nanoparticle based sensing elements are printed between conductive electrodes. The conductive electrodes may be printed on an exterior of the object or may be formed on a substrate that may be attached to the exterior of the object.

Different temperature of the object may apply different strains on the multiple nanoparticle based sensing elements. For example—the object may expand when heated and may shrink when cooled.

Step 24 may be followed by step 26 of determining, based on the sensed information, an object temperature parameter.

The object may include a movable mechanical element; and the method may include determining, based on the sensed information, a movement related parameter of the movable mechanical element.

The movement related parameter may be indicative of a current or future movable mechanical element malfunction, may be indicative of a status of the object (for example whether the object overheats), may be indicative of a functionality of the object, and the like.

The object may be, for example, a pump, a rotor, a compressors, a turbine, or an insulin pump.

Figure 2A:
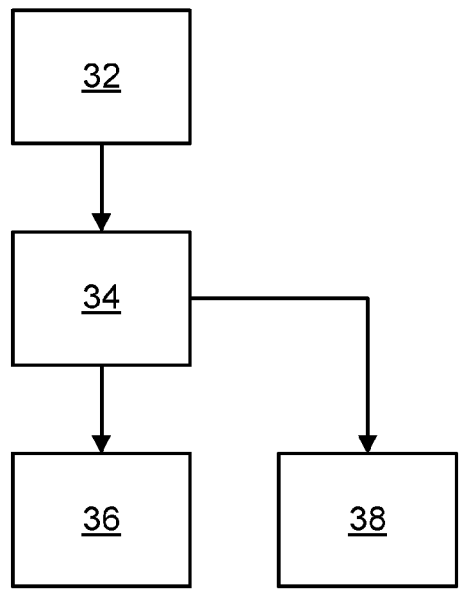

FIG. 2A illustrates method 30 for monitoring an object that includes a movable mechanical element.

Method 30 may include step 32 of receiving or learning a relationship between values of the sensed information and values of the movement related parameter. The learning may be involve performing, during a learning period, multiple repetition of step 34, while also learning or estimating the values of the movement related parameter.

Step 32 may be followed by step 34 of measuring one or more resistances of one or more nanoparticle based sensing elements to provide sensed information. The one or more nanoparticle based sensing elements include nanometric particles having an electrical resistance that is responsive to at least one out of pressure and temperature. The one or more nanoparticle based sensing elements are printed between conductive electrodes. The conductive electrodes may be printed on an exterior of the object or may be formed on a substrate that may be attached to the exterior of the object.

Step 34 may be followed by step 36 of determining, based on the sensed information, a movement related parameter.

The movement related parameter may be indicative of a current or future movable mechanical element malfunction. The movement related parameter may be indicative of a status of the object.

Movements of the movable mechanical element (rotational movements, non-rotational movements, and the like) vibrate the object and these vibrations may change the resistance of the multiple nanoparticle based sensing elements.

The object may be, for example, a pump, a rotor, a compressors, a turbine, or an insulin pump.

Figure 2B:
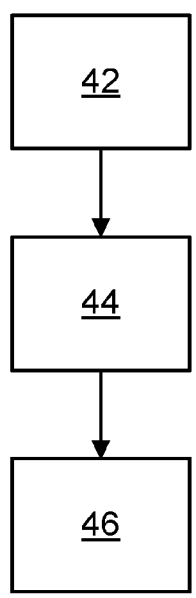

FIG. 2B illustrates method 40 for monitoring an object that includes a movable mechanical element.

It has been found that a under the same pressure and temperature conditions, changes in a thickness of an area of a fluid conduit may be reflected in an amplitude of sensed information. The amplitude represents the difference between minimal and maximal values of the sensed information.

Method 40 may include step 42 of receiving or learning a relationship between values of the sensed information and values of the thickness parameter. The learning may be involve performing, during a learning period, multiple repetition of step 44, while also learning or estimating the values of the thickness parameter.

Step 42 may be followed by step 44 of measuring one or more resistances of one or more nanoparticle based sensing elements to provide sensed information. The one or more nanoparticle based sensing elements include nanometric particles having an electrical resistance that is responsive to at least one out of pressure and temperature. The one or more nanoparticle based sensing elements are printed between conductive electrodes. The conductive electrodes may be printed on an area of an exterior of a fluid conduit or may be formed on a substrate that may be attached to the area.

Step 44 may be followed by step 46 of determining, based on the sensed information, a thickness parameter related to the area.

The thickness parameter may be indicative of at least one out of (a) a thickness of the area and (b) a change in thickness of the area.

Step 44 may be executed during a first period of time and a second of period time.

The second period of time is later than (follows) the first period of time.

The temperature and pressure conditions within the first and second periods of time are substantially equal to each other. Thus—temperature patterns and/or pressure patterns that exist in the first period of time also exist in the second period of time. There may be insignificant differences between the temperature patterns and/or pressure patterns that exist in the first and second periods of time.

These conditional may be maintained in temperature and pressure controlled environments such as but not limited to manufacturing lines.

Step 46 may include: (a) calculating a first difference between maximal and minimal resistance values measured during the first period of time, (b) calculating a second difference between maximal and minimal resistance values measured during a second period of time; (c) comparing the first difference to the second difference, (d) determining a relationship between a thickness of the area at the first period of time and the thickness of the area at the second period time based on the comparison result.

For example—step 46 may determine that thickness of the area reduced between the first and second time periods when the second different exceeds the first difference.

Step 46 may include estimating an occurrence of a future failure of the area based on a difference between the second difference and the first difference.

Figure 3:
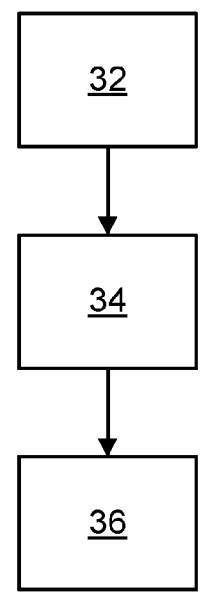
Figure 4:
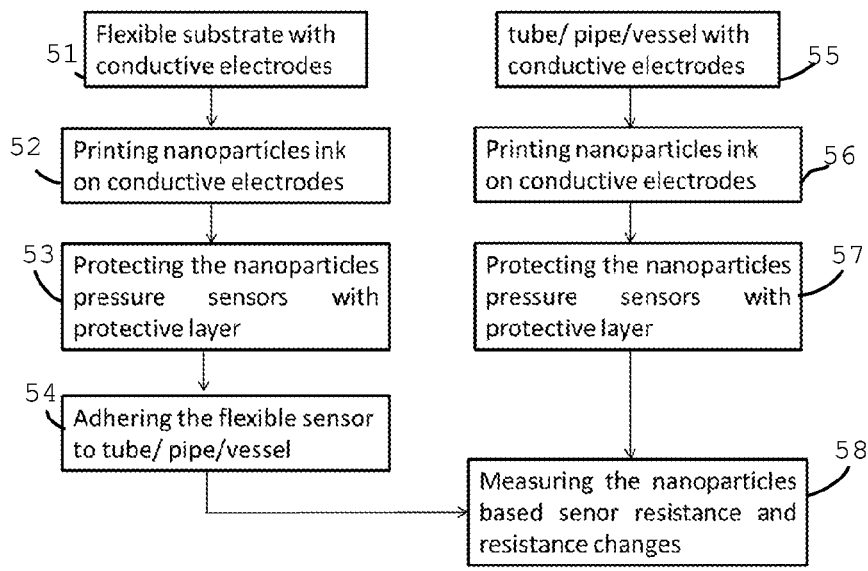

FIG. 3 illustrates method 50 for monitoring an object that includes a movable mechanical element.

Method 50 may include step 52 of receiving or learning a relationship between values of the sensed information and values of the bolt status parameter. The learning may be involve performing, during a learning period, multiple repetition of step 54, while also learning or estimating the values of the bolt status parameter.

Step 52 may be followed by step 54 of measuring one or more resistances of one or more nanoparticle based sensing elements to provide sensed information. The one or more nanoparticle based sensing elements include nanometric particles having an electrical resistance that is responsive to at least one out of pressure and temperature. The one or more nanoparticle based sensing elements are printed between conductive electrodes. The conductive electrodes may be printed on an object through which the bolt passes or may be formed on the object.

Step 54 may be followed by step 56 of determining, based on the sensed information, a bolt status parameter.

The bolt status parameter may be indicative of a current or future movable mechanical element malfunction. The bolt status parameter may be indicative of a status of the object.

The materials, dimensions and/or shapes and/or measured values that are illustrated below are merely non-limiting examples.

There may be provided two main options for fabrication of the pressure sensor (see FIG. 5 illustrating method 50). One option is illustrated by sequence of steps 51, 52, 53 and 54. The other option is illustrated by sequence of steps 55, 56 and 57. After fabrication the pressure sensor is used for measurements (step 58).

The nanoparticle ink is printed over a thin sheet (~25 um) of a flexible substrate (e.g., Kapton) with conductive electrodes (e.g., copper and gold). A thin layer, for example a ~50 um layer of PDMS (Polydimethylsiloxane), is then applied on the sensing part as a protective layer. The nanoparticles based pressure sensors are adhered using, for example, PANGOFOL (two part rubber bonding cement with activator 968F) to the surface of the conduit (tube/pipe/vessel). An electrical circuit is used to provide information about the pressure of the liquid within the conduit measure the resistance and resistance changes of the nanoparticles based sensor on the tube/pipe/vessel.

Figure 5A:
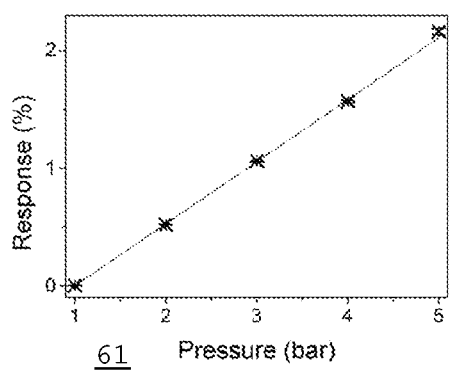
FIGS. 5A, 5B, 6, 7, 8A, 8C, 9B, 9C, 10D, 11, 12, 13B, 13D and 14 illustrate examples of measurements.
Figure 5B:
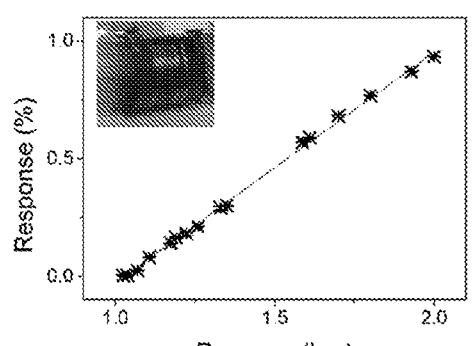

FIG. 5A and FIG. 5B depict the response of nanoparticles based pressure sensors adhered to a rubber tube (graph 61 of FIG. 5A) and Silicon tube (graph 62 of FIG. 5B) to fluid (e.g., $N_2$) pressure changes. The response shows a wide range of sensitivity (1-5 bars) and high resolution to small pressure changes (tens of millibars). The baseline resistances of the sensors were 2 Mohm±0.5 Mohm.

In FIG. 5A—Nanoparticles based pressure sensor adhered to rubber tube with total diameter of 10 mm and wall thickness of 1 mm. The error bars stand for the standard deviation of 100 resistance measurements at specific pressure (R square>0.999).

In FIG. 5B—Nanoparticles based pressure sensor adhered to Silicon tube with total diameter of 6 mm and wall thickness of 1 mm. The error bars stand for the standard deviation of 100 resistance measurements at specific pressure (R square>0.998).

The nanoparticles are printed directly on the tube/pipe/vessel having conductive electrodes printed beforehand. Silver electrodes (e.g. AgCite from Nanodimension) are patterned on the surface of the tube. Photonic sintering (e.g. by Xenon) is performed in order to sinter the silver electrodes and make them conductive, e.g. less than 50 ohm. Nanoparticles ink is printed between the conductive electrodes using inkjet or other printing techniques. Photonic sintering (e.g. by Xenon) is performed to reach sensor baseline resistance of Mega ohms.

Figure 6:
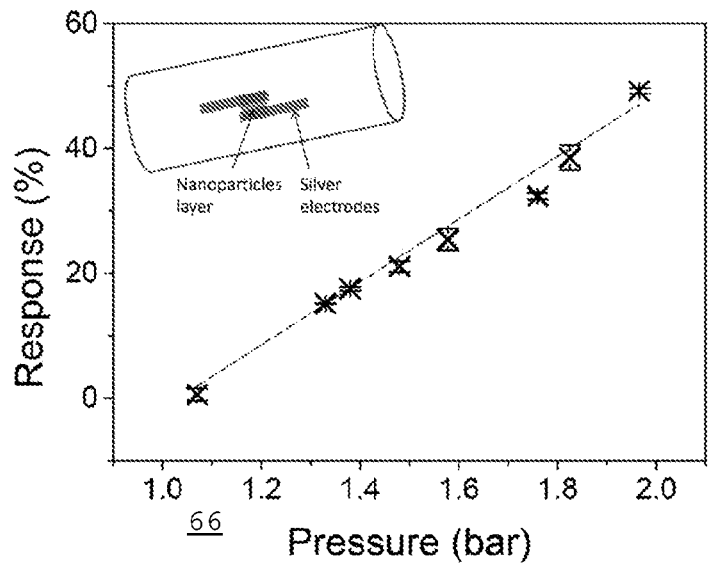

FIG. 6 depict the response (graph 66) to pressure of nanoparticles based pressure sensor that is directly printed on a Silicon tube to fluid (e.g., $N_2$) pressure changes.

Nanoparticles based sensor directly printed on a Silicon tube with total diameter of 6 mm and wall thickness of 1 mm. The error bars stand for the standard deviation of 10 resistance measurements at specific pressure (R square>0.98).

In relation to FIGS. 5A, 5B and 6—the pressure inside the tube were measured with an external pressure sensor (e.g. from LUTRON ELECTRONIC ENTERPRISE). Fluid pressure changes within the tube/pipe/vessel cause lateral surface strains. The strain is measured by the nanoparticles based strain sensor. The nanoparticles based sensor provides high sensitivity to strain and therefore enables measuring the pressure changes with high resolution (ten of millibars). The indication of pressure changes with high pressure sensing resolution can be used in order to detect small pressure variations and alert of any abnormal changes before there are actual leaks.

Referring back to FIG. 6—for direct printing applications, the tube/pipe/vessel material has great impact on the printing process and the adhesion of the nanoparticles based sensor to the tube/pipe/vessel.

If the tube/pipe/vessel is conductive, an isolating layer can be deposited on it to form a substrate on which the electrodes and sensing nanoparticles can be printed on.

In case the tube/pipe/vessel material is not suitable for deposition processes (e.g., adsorbing material), an appropriate coating layer (e.g., polyimide) can be deposited to form a surface suitable for direct printing.

The nanoparticles ink can be printed via several printing techniques (e.g., inkjet printing, aerosol printing, pad printing). Printing on non-flat surfaces (e.g., curved) can be achieved with robotic sample holder that moves in space or with a printer head (e.g., nozzle) that move in space to fit to the surface structure. The conductive electrodes can have several structures for example, interdigitated electrodes. An array of sensors can be printed to achieve high location resolution of pressure sensing.

There may be cases where a single sensor (i.e. sensing structure composed of the sensing material) is printed to a surface or device, or multiple sensors are printed. The sensors may have any concave, convex, or complex 2D shape printed on a 3D or 2D surface. The sensors may be disjoint from each other, overlapping in space. In such a case, the sensors may be isolated from each other. The sensors may be printed and cured in one phase or more than one phase.

The above sensors may be controlled by a single control unit (e.g. PCB with firmware) that both controls the measurements and reads the sensors. Sensors printed/attached to a specific device may be all connected to a single control unit, or each one to a separate control unit.

In case sensors are printed/attached to several devices, they may each be controlled by a single control unit, or sensors printed on several devices may be all connected to a single control unit.

It is also possible that a single sensor will be printed/attached onto more than a single device, in order to measure their distance for example.

The control unit may include a power source, or may be connected to an external power source, or both.

The control unit may or may not include a CPU or other computing unit for processing the sensors data.

The control unit may or may not include a memory unit for storing raw data and/or code and/or processing results.

The control unit may or may not include a wireless and/or wired communication method.

Figure 7:
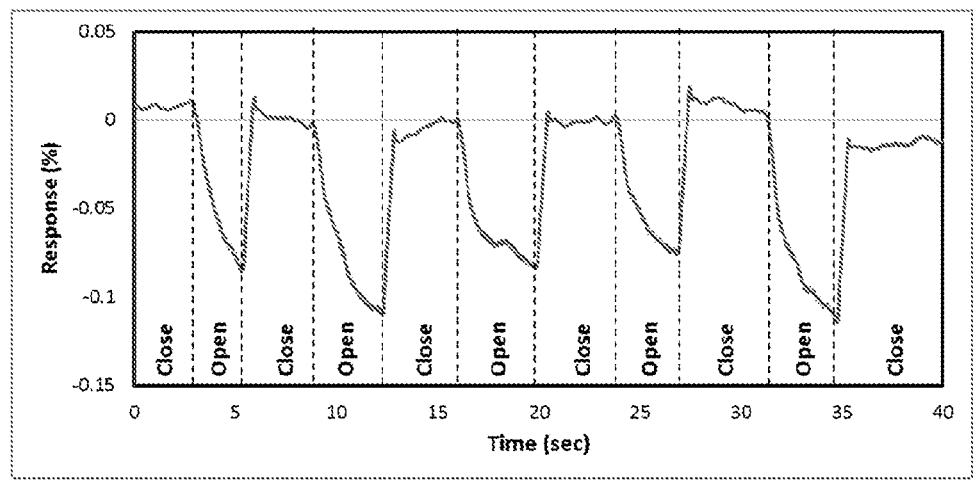

In FIG. 7—nanoparticles based pressure sensor adhered to Silicon tube with total diameter of 6 mm and wall thickness of 1 mm. The tube was connected to infusion bug and a manual valve that controls the flow from the infusion bag. The valve was opened and closed as indicated on the graph. The opening and closing induced pressure changes in the silicon tube. Those pressure chances were detectable with the nanoparticles based pressure sensor. The pressure changes from open to close are in the order of few millibars.

Example of Applications

The sensing device method may be applicable to various application, only some of which are listed below:

Measuring pressure, pressure changes, flow rate, flow rate changes, blockage, leakage in pipe lines and vessels, for blood and drug infusions, insulin pumps, dialysis, fuel and gas lines, water pipes, lubricant lines/vessels, and any other application. The measurement is sensitive to pressure changes that are very small (millibars resolution), on tubes with very small OD (order of one millimeter).

Measuring pressure changes in tube/pipe/vessel for predictive maintenance.

Assisting to (or being part of) an alert system that provides detection of leaks, foreign matter; shape abnormalities, micro fractures specifically.

Detecting local defect or thickness variation at the circumference by sensing the strain along the circumference which is divided un-evenly. Therefore, by using several sensors along the circumference, the abnormality can be monitored and an alert can be given before the occurrence of a burst, leak or critical damage.

Assisting to (or being part of) a system for leaks and blockages in insulin pumps: printed nanoparticle based sensors can be applied on the outer surface of insulin pumps piping or reservoir to detect irregular pressure changes that indicate on possible problems such as leaks and blockages and close the feedback loop on the delivery mechanism.

The system and method may exhibit at least some of the following:

High sensitivity of sensors.

Lateral strain sensing mechanism.

Small size of the sensors (several sensors can be placed at the circumference of a tube/pipe/vessel).

Direct printing exhibit new advantage since there is no adhesion layer that absorb part of the strains and pressures. The responses the pressure/strain are dramatically larger.

Pressure sensors are located directly on the tube/pipe/vessel at points of interest. The low cost of the sensors enable the assembly of many sensors along and at the circumference of tube/pipe/vessel. The array of the low cost sensors provides the ability to perform array calculations and analytics on a large scale.

The installation of the sensors can be: during the production, before the installation and/or during operation of the tube/pipe/vessel without causing any downtime. The installation time is short and can be performed by adhering the sensor to the tube/pipe/vessel or by direct printing/stamping of the sensors on the tube/pipe/vessel.

The sensing does not require any drilling of access holes in the pipe/vessel

The data from the sensors can be transferred to a monitoring station, server, network, cloud. The data can be also stored at the sampling location. The data can be transferred via wireless or wired protocols.

Energy can be supplied with a battery, solar source or any other power source.

Photonic sintering may be used to tune the resistance and sensitivity in-situ (on the vessel surface after directly printing the nanoparticles) to achieve a combination of low power consumption (high enough resistance) and increased sensitivity.

Handling temperature and humidity changes can be facilitated via 3 in 1 platform that can sense humidity temperature and pressure on the same platform and compensate for environmental changes in the pressure sensor.[2]

Low voltage (below 5V) and low power consumption operation of the strain sensors so to be compatible with the common batteries of portable device.

The various text provides examples of tests conducted by the sensors/using any of the mentioned above methods.

Overheating of Rotary Equipment—Pumps, Rotors, Compressors and Turbines

A nanoparticle based sensor was mounted on a centrifugal pump and another nanoparticle based sensor on the outlet pipe of the pump. Each sensor was connected to an electronics unit for sampling the resistance of the sensor which was connected to a server for data collection. An off the shelf thermocouple was placed near each of the sensors as reference.

Measurements were taken both on the pump and pipe by both the nanoparticles based sensors and the thermocouples. The pump was turned on.

Figure 8A:
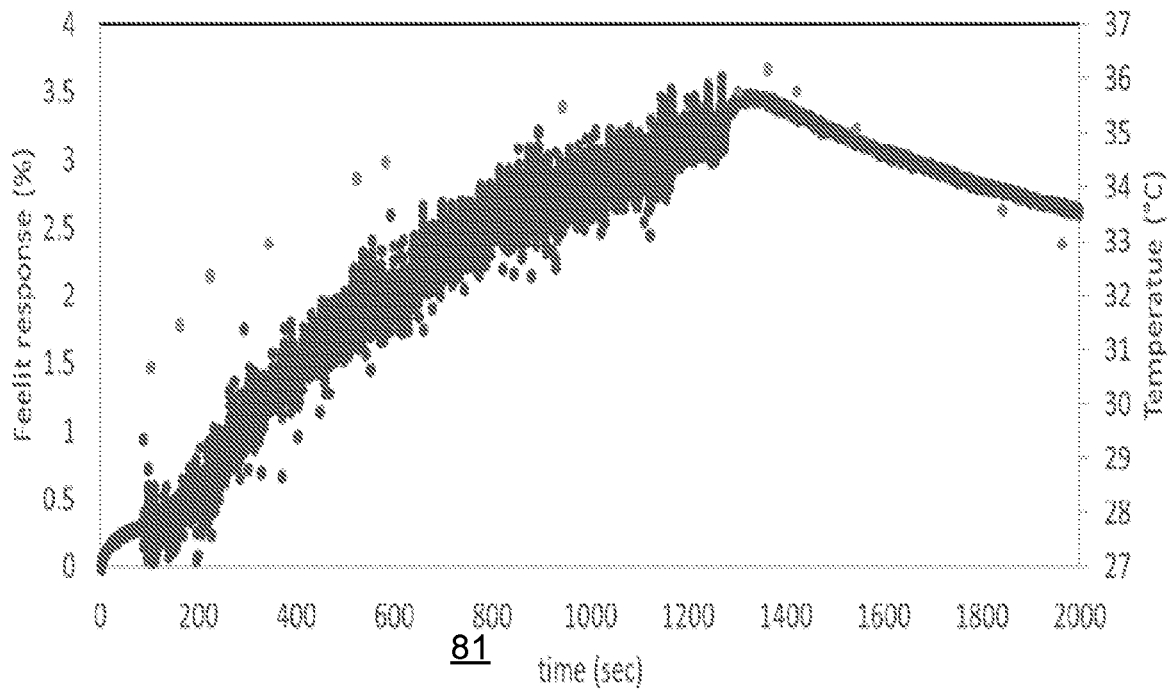
Figure 8C:
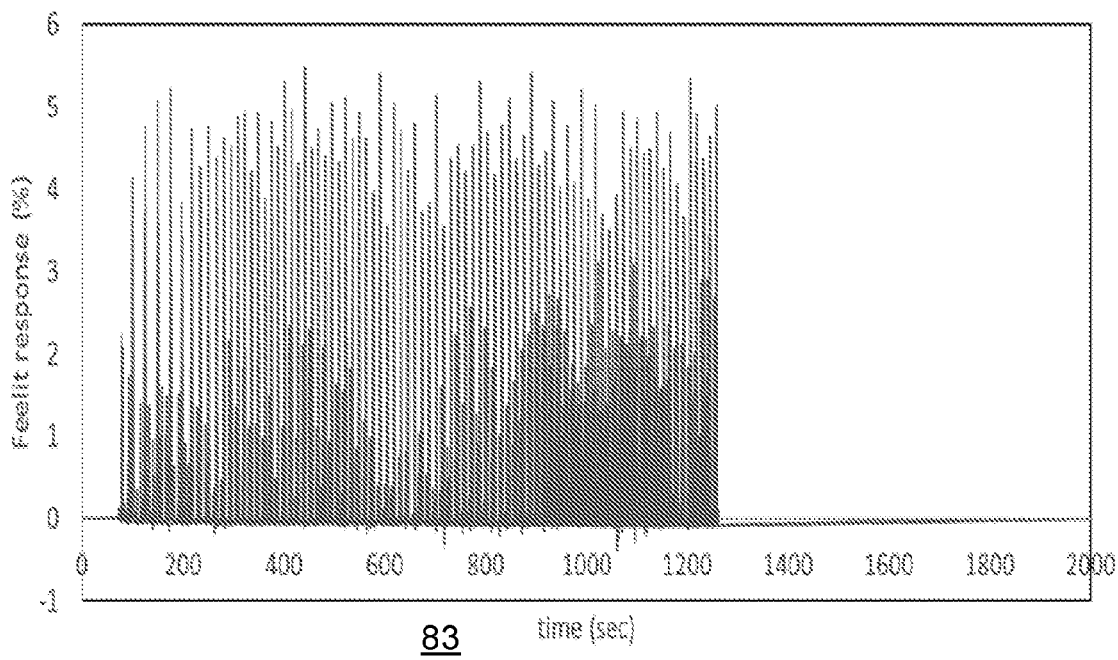
Figure 8B:
FIGS. 8B, 8D, 9A, 10A, 10B, 10C, 13A, 13C illustrates examples of objects.

During pump operation both vibrations (in high frequency) and temperature increase (low frequency) of the pump are noticeable (FIGS. 8A and 8B). The pump was then turned off and left to cool down. During the cooling process the pump is still (doesn't vibrate) and therefore the vibration signal (picked up by the nanoparticles based sensor when pump was running) is no longer seen in the response of the nanoparticles based sensor. On the other hand, the cooling process is clearly visible and there is good correlation between the nanoparticles based sensor response (blue dots) and the thermocouple (orange dots) throughout the cooling process as well as when the pump was heating up during operation. In FIG. 8B the sensing elements (SE) form two linear arrays that are substantially normal to each other.

Figure 8D:
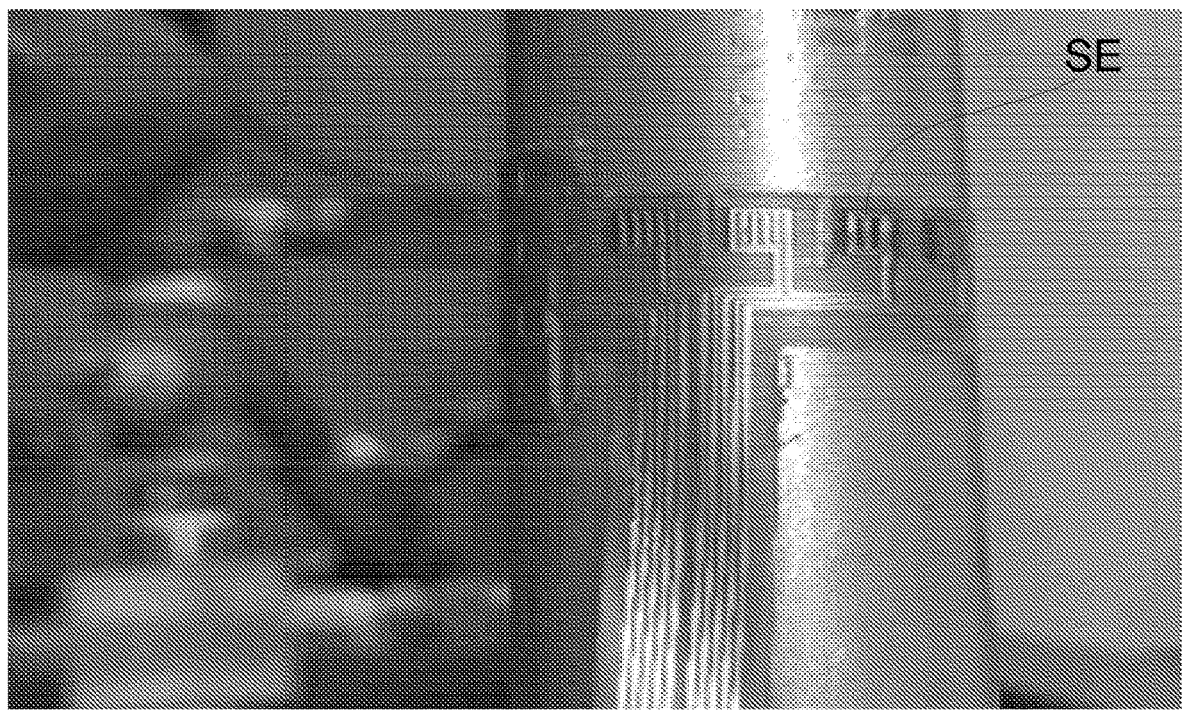

The additional nanoparticles based sensor placed on the outlet metal pipe of the pump served as a reference that vibrates with the pump while maintaining constant temperature (as a result of the water flowing through the pipe). As can be seen in FIGS. 8C and 8D, when the pump turned on vibrations were measured by the nanoparticles based sensor, yet no low frequency change associated with temperature change was seen. In FIG. 8D some of the sensing elements (SE) surround the pipe (form a ring of sensing elements) and some form a linear array along the longitudinal axis of the pipe.

These results provide a good indication for the ability to measure spatial temperature gradient, meaning, by spreading several sensors in different locations, the temperature distribution can be monitored. When the temperature distribution in equipment such as pumps, rotors, compressors and turbines changes or when the temperature ranges exceed normal values, the nanoparticles based sensors can alert and prevent breakage and down time of the asset.

The accuracy of the measurement compounded with the flexibility of the sensors is of high importance and provides the ability to connect the sensors in "hard to get" areas on the tools, thus providing real temperature mapping of equipment.

The combination of flexible sensor, low power consumption (~10 µA) and wireless communication protocols enables a predictive maintenance system that alerts on problems and can be installed in desired locations on the equipment to run on a small sized battery (give a representative spec.) for over 3 years of operation without having to replace the battery or based on energy harvesting communication technology (e.g. NFC and RFID).

In conclusion, the presented nanoparticles based sensor can monitor:
 a. Operations of the pump (on/off) and uptime monitoring
 b. Temporal temperature changes
 c. Spatial temperature gradients can be measured using several sensors or spatially distributed sensing areas System monitoring e.g. measuring pump and pipe response could yield additional value on system behavior over time.

Pressure Sensing in Pipes Pipe Thickness Measurements

The purpose of this test is to detect pressure changes within a pipe using a nanoparticle based sensor attached to the outer surface of the pipe and determine the Limit of Detection (LOD) of pressure changes. The strain that the outer surface of a pipe experiences as a result of internal pressure changes is governed by the geometry and mechanical properties of the pipe where, epsilon is the strain, P is the pressure, E is Young's modulus, v is Poisson's ratio, t is the pipe wall thickness and D is the internal diameter of the pipe.

Figure 9A:
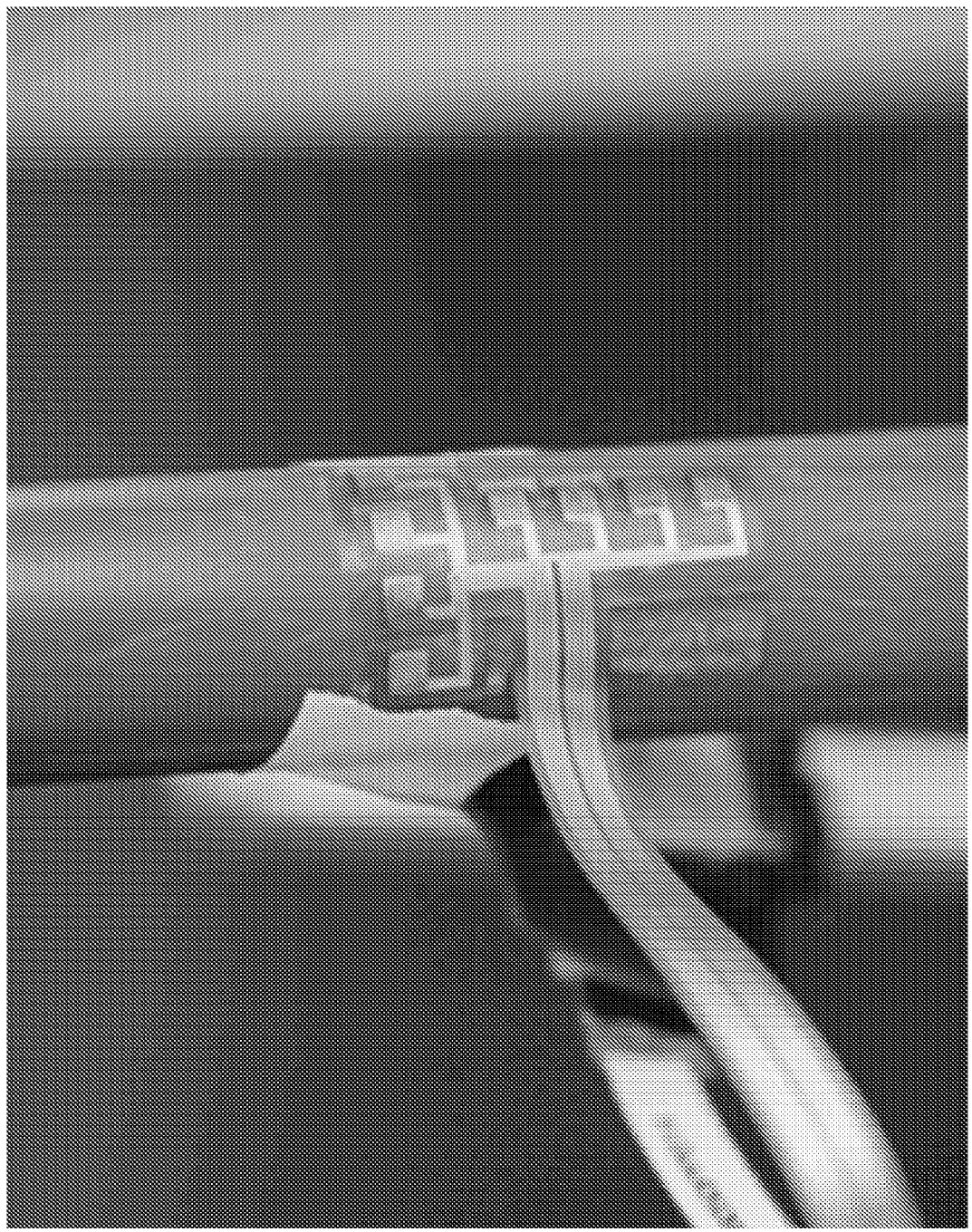
Figure 9B:
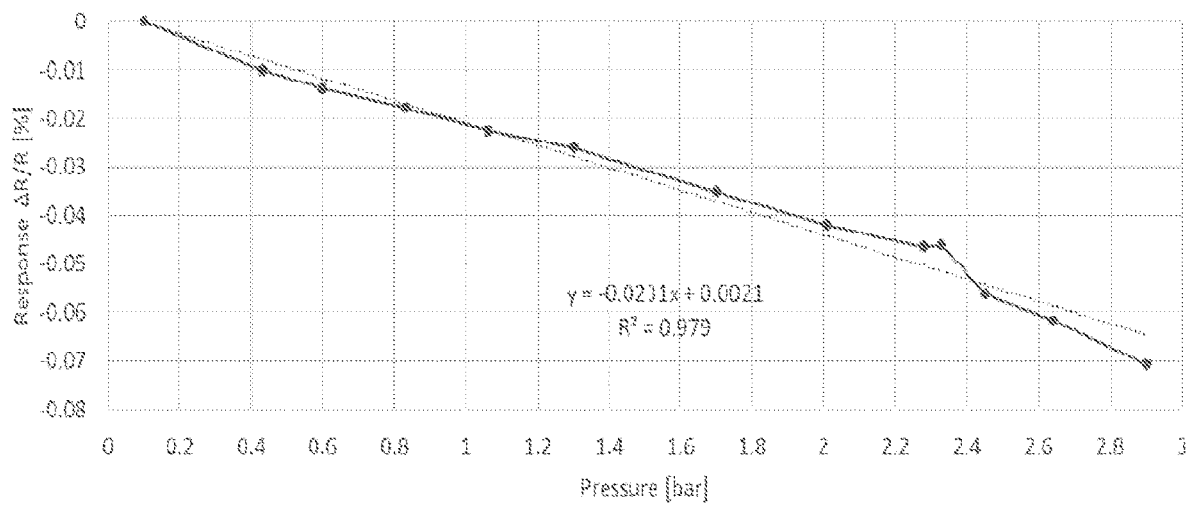

The test was done using a PVC pipe ($E_{pvc}$=3.4 GPa and $v_{pvc}$=0.4) with a wall thickness of 2 mm and outer diameter of 20 mm. The sensor was directly taped onto the outer surface of the PVC pipe, using double sided tape. Both ends of the pipe were connected to a pressurized air source. The pressure was increased gradually, and the sensor response was logged after each change. The sensor taped to the PVC pipe included 8 sensing areas as shown in FIG. 9A. FIG. 9B shows the response of one sensing area to pressure changes. For example, when the pressure was increased by 0.8 bar, the sensors response was −0.02%. According to this figure it is estimated that the experimental nanoparticles based sensor's limit of detection (LOD) is ~0.1 bar. The other 7 sensing areas experienced similar responses to pressure indicating the strain experienced by the pipe's outer surface was uniform.

Figure 9C:
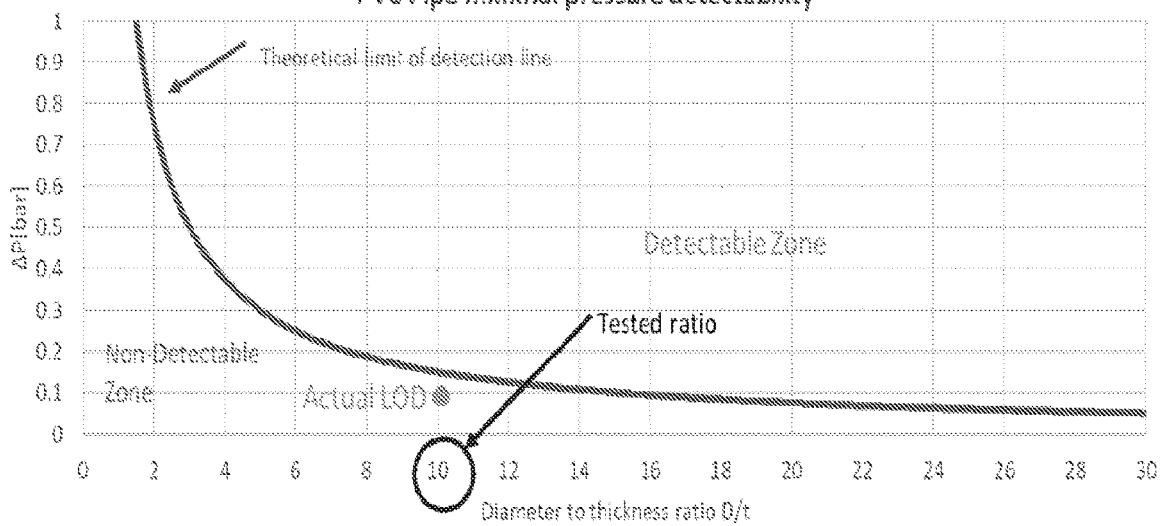

FIG. 9C shows a theoretical curve (based on Equation 1) indicating the minimal pressure change that can be detected by the nanoparticle based sensors assuming the sensor's limit of detection to strain (experimentally found to be 0.002% strain). The theoretical model assumes a thin walled pipe (t<<D) and a sensor location that is relatively far away from the cylinder ends (far away is defined as a distance larger than the multiplication of the cylinder diameter by 10). The curve plots the minimal detectable pressure change as a function of the ratio between the pipe outer diameter and its wall thickness according to the following correlation:

$$\Delta P = \varepsilon_c \cdot \frac{E \cdot t}{R\left(1 - \frac{1}{2}v\right)}$$

$\Delta P$ = pressure change $\varepsilon_c$ = circumferential strain $E$ = youngs modulus $t$ = wall thickness $R$ = Radius $v$ = Poissons's ratio Where $\varepsilon_c$ is the experimental strain limit of detection. Based on this plot the minimal detectable pressure change can be estimated for a given D/t ratio. This theoretical minimal detectable pressure change can be compared to the experimental LOD extracted from FIG. 9B (according to signal to noise analysis). As presented in FIG. 8C, the actual LOD extracted from FIG. 2B is close to the theoretical model . . . .

Pipe breakage prediction—the objective is to determine if the sensor can detect the change in thickness of a pipe's wall. The change in wall thickness can result from corrosion or abrasion, usually due the properties of the fluid that flows in the pipe. At some point in time, after the pipe wall thickness decreases and uncontrolled leakage or burst of the pipe can occur. The consequence of such uncontrolled leakage or burst can cause:

a. adverse safety events affecting people, equipment, and the environment around the leakage, especially when the material flowing in the pipes is hazardous b. adverse financial losses as a result of unexpected pipe-line shut down until the pipe part is replaced or damage to assets and to the environment Following the preventive maintenance approach, the pipes will be replaced at a time scheduled by the maintenance personnel in order to prevent leakages/burst and the resulting damages. However, this approach is not cost effective.

For predictive maintenance (e.g., understand the pipe status, namely it's wall thickness, using dedicated sensors), the current solutions include acoustic sensors (Fischer, n.d.). Yet, this solution is service based (not real time), expensive and less relevant in hard to get places (e.g., beneath the ground or elevated pipes). With the nanoparticles based sensors described above, the wall thickness of the pipe can be estimated:

Non-intrusively, using sticker or direct printing format—no need to stop the production line or the flow in the pipes for installing the sensors The measurements may be executed continuously The measurements may be executed in real time Due to low power consumption, the sensors can measure for years without the need to replace the battery The main mechanism for assessing pipe wall thinning decrease due to corrosion or abrasion is by monitoring the pipe strain resulting from characteristic pressure changes in the pipe. The initial stage when the pipe is healthy (has the original wall thickness) can serve as a good reference point to normal strain. In this initial step, the change in pressure will apply some strain on the pipe wall that will result in specific response of the nanoparticles based sensor. After a destructive process, like corrosion or abrasion, the pipe wall thickness will decrease, and therefore, the same pressure gradients will result in higher strains applied on the pipe walls, which will result in higher responses of the nanoparticles based sensors. When the strain on the pipe reaches a critical threshold, the sensing system will alert about the change and thereby the problem.

For demonstrating the above-mentioned description, nanoparticles based sensors were applied on the outer surface of a thick-walled Aluminum pipe. The thickness of the wall was decreased by lathing the inner part of the pipe and increasing its inner diameter. The pipe was connected to a pressurized tube from both ends, and the sensor's response measured (see FIG. 3). The results were normalized to the limit of detection before lathing, which was 0.28 bar. The initial pipe wall thickness was 7.2 mm. Increasing the pressure from 0.28 bar to 0.5 bar yielded response of ~0.15% in the nanoparticles based sensor. After the inner diameter was increased by 0.5 mm (by lathing the inner wall), the sensitivity to pressure increased 3 times from the initial state. Increasing the pressure from 0.28 bar to 0.5 bar yielded response of ~0.43%.

Figure 10A:
Figure 10B:
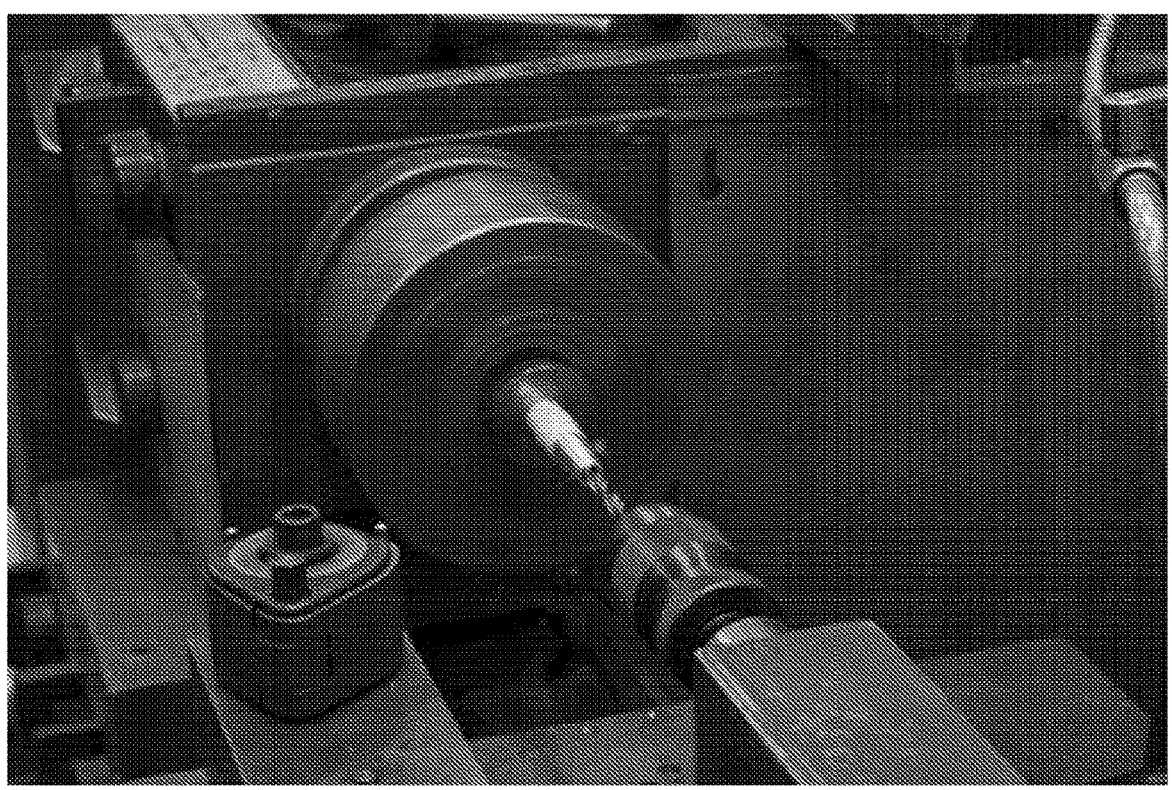
Figure 10C:
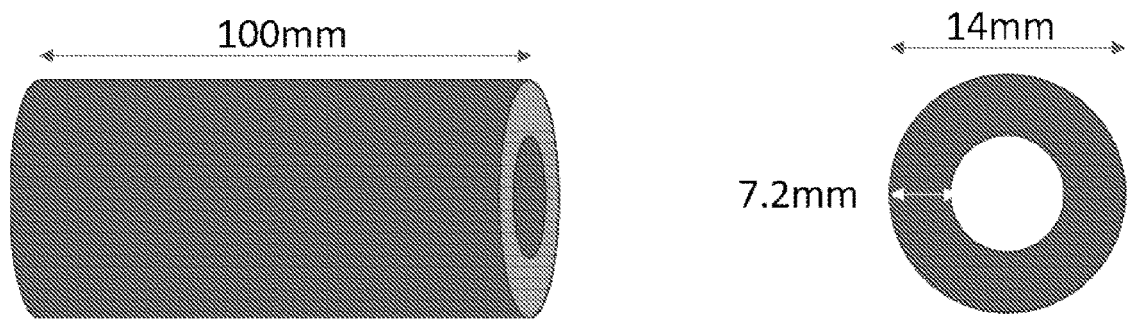
Figure 10D:
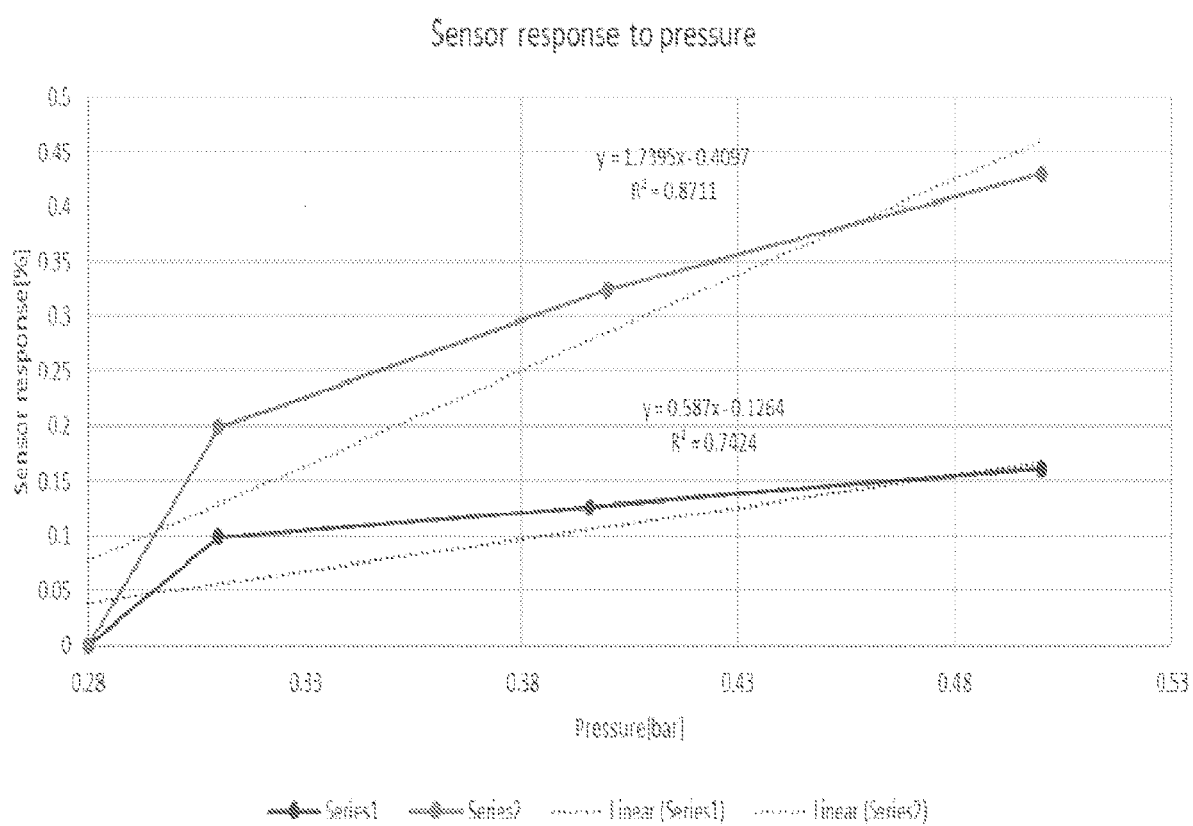

FIGS. 10A-10D illustrates the effect of pipe wall thinning on the response of nanoparticles based sensor to pressure changes in the pipe. FIG. 10A—a picture of the Aluminum pipe connected to pressurized tube. FIG. 10B—a Picture of the Aluminum pipe attached to milling machine. FIG. 10C—illustrates the initial dimensions of the Aluminum pipe. FIG. 10D—illustrates the response of the nanoparticles based sensor to pressure increase in the Aluminum pipe at initial dimensions (blue line), and after thinning the pipe wall to 0.5 mm (orange line).

Aluminum Plate Tapping

Figure 11:
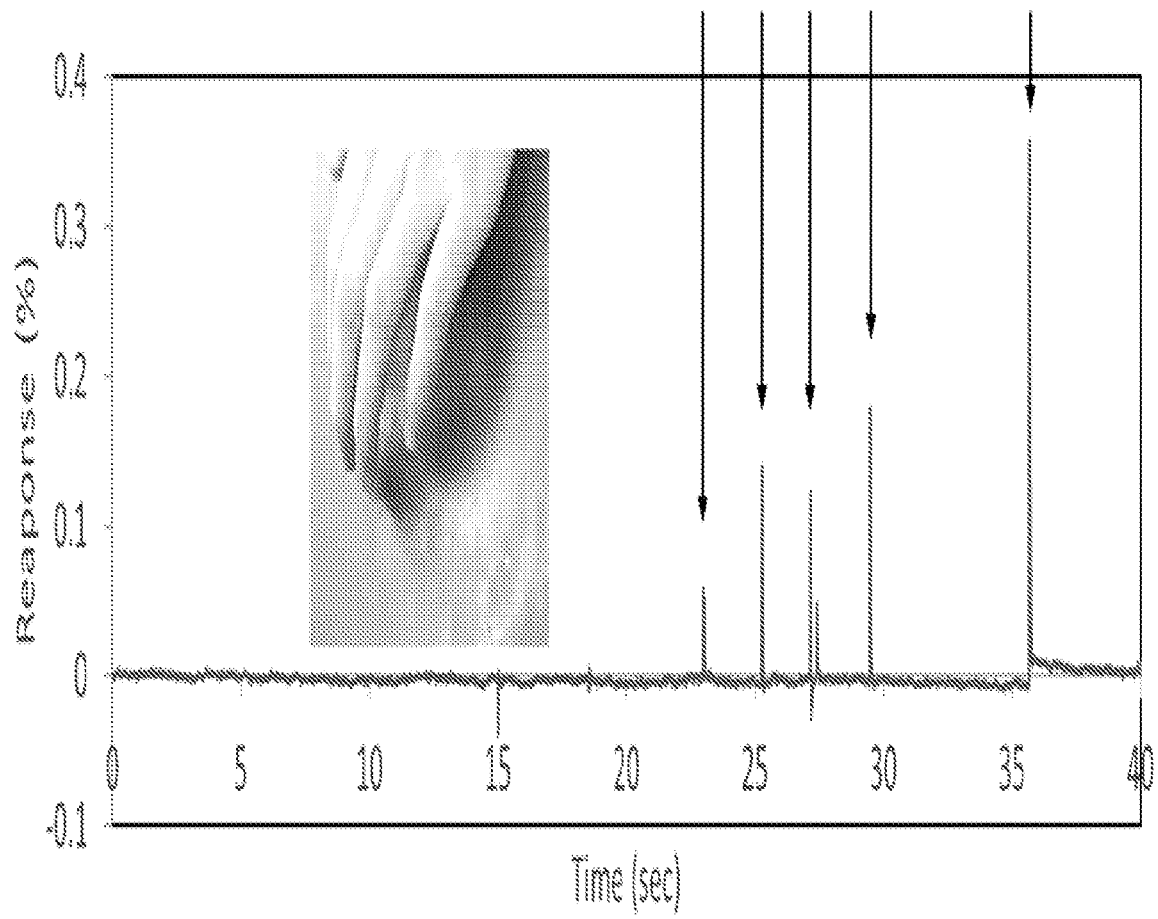

To monitor when an object is been touched, tapped, scratched etc. nanoparticle based sensors can be tapped to the object at the opposite side of the interaction events to sense the deformations resulting from the interaction events. As can be seen in FIG. 11, soft tapping on a 3 mm aluminum plate can be monitored by nanoparticles based sensors tapped to the back side of the plate. The measuring frequency was 60 Hz which was enough to detect the gentlest tap seen as a spike signal on the $23^{rd}$ sec. Since the response size is proportional to the load applied it was estimated (from plate weight loading experiments) that the tap on the $23^{rd}$ sec is equivalent to a load of 40 gram.

FIG. 11 illustrates tapping experiment on a 3 mm aluminum plate shows that finger tapping on the aluminum plate can be monitored using nanoparticles based sensors tapped to the back side of the plate.

Vibration Monitoring:

The ability to measure, monitor, and analyze vibration is essential for many industries. The most common method of acquiring vibration data involves connecting accelerometers and configuring them into a data acquisition system that can deliver high-resolution (24-bit) vibration data at very high sample rates. (Hanly, 2018) Vibrations produced by industrial machinery are vital indicators of machinery health. Vibration analysis is used as a tool to determine a machine's condition and the specific cause and location of problems, expediting repairs and minimizing costs. Machinery monitoring programs record a machine's vibration history. Monitoring vibration levels over time allows prediction of problems before serious damage can Occur.

Figure 12:
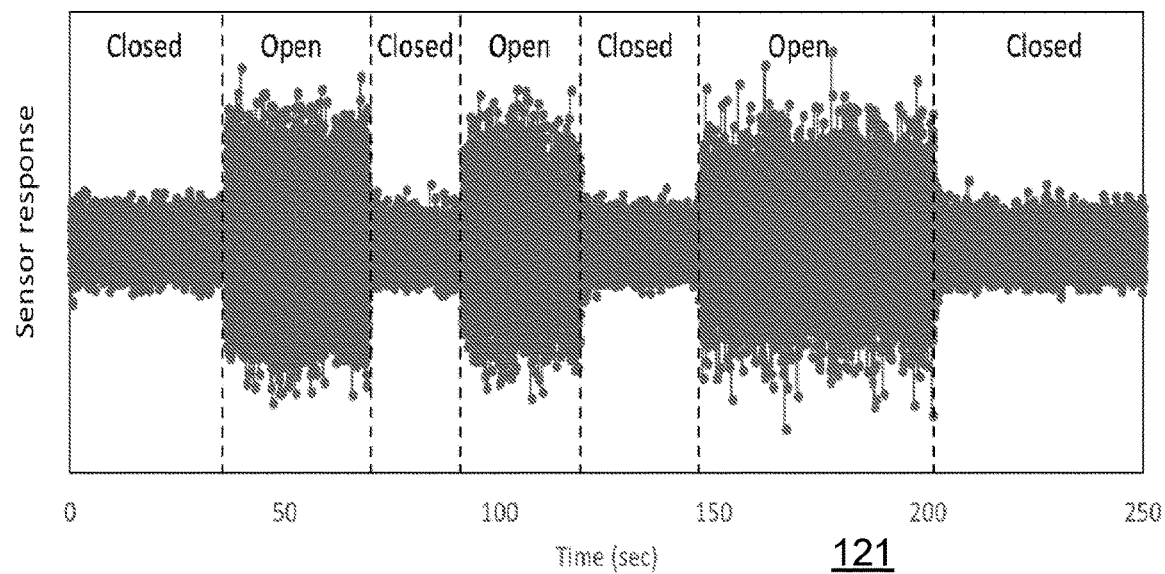
Figure 12:
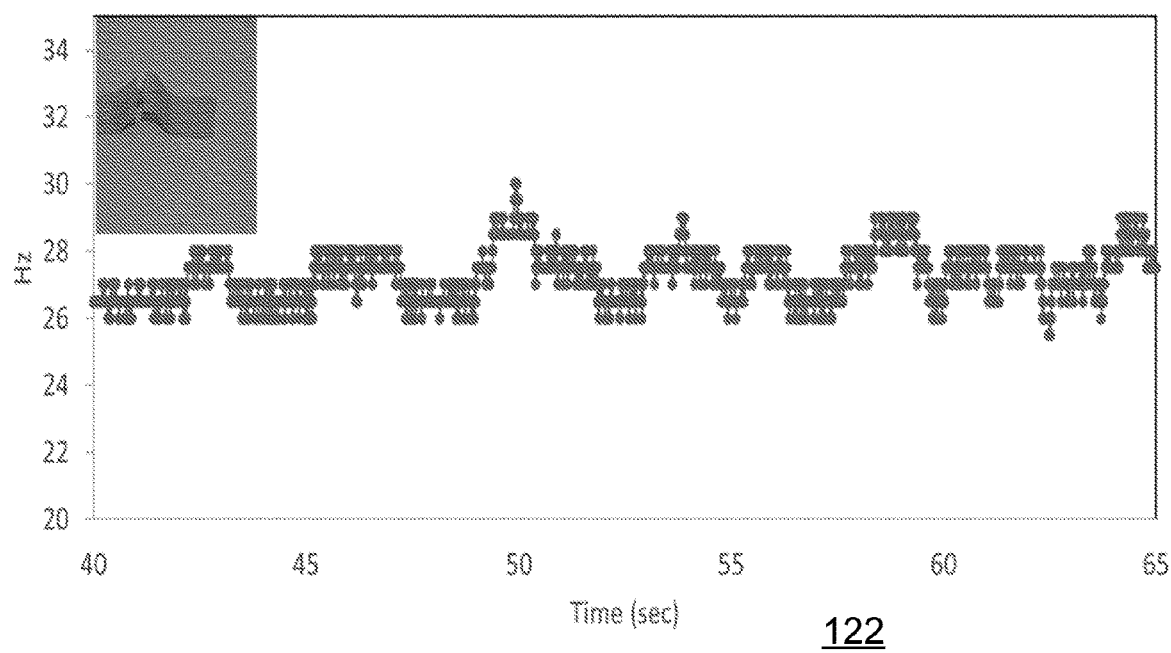

With nanoparticles based sensors, a new way to measure vibration is introduced. The vibrations are measured using flexible thin (30 μm) nanoparticle based sensor attached to the vibrating machine while the sensing area itself is not or partly attached or attached via a deformable support layer to the target equipment whose vibrations are to be measured. During vibration, the nanoparticles sensors experience strains and therefore, the vibration can be measured. For example, in FIG. 12, nanoparticles based sensors were attached to a vibrating pump. The pump motor rotates at a speed of 1440 rpm which means 24 rounds per second (based on the pump spec). In the upper part of FIG. 12 (graph 121), the nanoparticles based sensor signal shows when the pump is turned ON and OFF. As can be seen, there are significant changes between the ON and OFF status. The nanoparticles based sensor was measured 60 time per second. Calculating the vibration from the sensors signal yielded average value of 27 rounds per second (FIG. 12, bottom—graph 122).

Therefore, using nanoparticles based sensor (patch configuration), the following can be calculated:

a. Operations of the pump (on/off)→uptime monitoring b. Frequency of the vibrations→rotational frequency monitoring The main advantages are a. Simple integration—"lick and stick"

b. Wireless communication as an option c. Small form factor d. Low power consumption Bolt Tightening and Loosening Bolted joints are critical to the safe operation of many types of equipment in a wide range of applications, including power generation, manufacturing, mining, construction, and transportation. In a bolted joint, tightening the nut actually stretches the bolt to a small degree, like pulling on a stiff spring. This stretching, or tension, results in an opposing clamp force that holds the two sections of the joint together. If the bolt comes loose, this clamping force weakens. The main reasons for bolt loosening are: (Smart Bolts, n.d.) Under-tightening, Vibrations, Embedding. If the joint has not been designed properly, or if the specified tension was not achieved on the bolt at the start, this embedding of the joint can lead to a loss of clamping force.

Gasket creep. Many bolted joints include a thin flexible gasket positioned between the bolt head and the surface of the joint to seal the joint completely against gas or liquid leaks. The gasket itself acts as a spring, pushing back against the pressure of the bolt and the joint face. Over time, and especially near high heat or corrosive chemicals, the gasket may "creep," which means it loses its springiness, leading to loss of clamping force and eventually to leakage or loosening of the bolts.

Differential Thermal Expansion. If the material of the bolt and the joint are different, large differences in temperature due to rapid environmental changes or cycling industrial processes can cause bolt material to expand or contract rapidly, possibly loosening the bolt.

Shock. Dynamic or alternating loads of machinery like generators, wind turbines, etc., can cause mechanical shock—a sudden force applied to the bolt or the joint—causing the bolt threads to slip relative to the threads of the joint Monitoring bolts loosening is highly valuable for structures health monitoring, assets monitoring and safety. The current approaches include acoustic and optic sensors, yet, there is no direct method to monitor the strain and pressure applied on the or around the bolt.

Figure 13A:
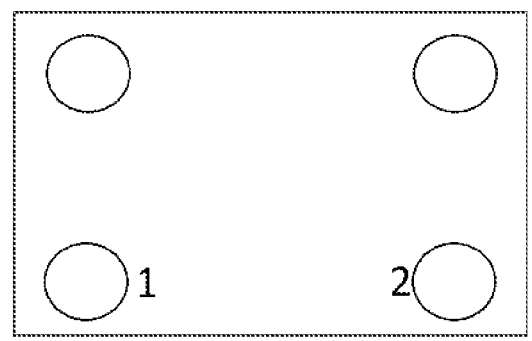

With nanoparticles based sensors, it is possible to directly monitor bolts tightening and loosening, due to their high sensitivity, flexible form factor and low thickness (~30 μm). In FIGS. 13A and 13B, a process involving the tightening of rubber sealing component is described. During the process, four bolts need to be inserted via the holes in the rubber sealing component (131), while rigid component cover the upper and lower part of the rubber. In this use case, nanoparticles based sensors were placed near the rubber holes, as indicated by 1 and 2. FIG. 13B shows the result of bolt tightening. Each time 1 or 2 are tightened, an increase of the sensor response is seen, the increase is sometimes followed by a decrease in the second sensor. For example, at 100 sec, an increase due to tightening the bolt near sensor 2 is seen, simultaneously, a decrease in sensor 1 is seen. This could result from rubber deformations.

Figure 13C:
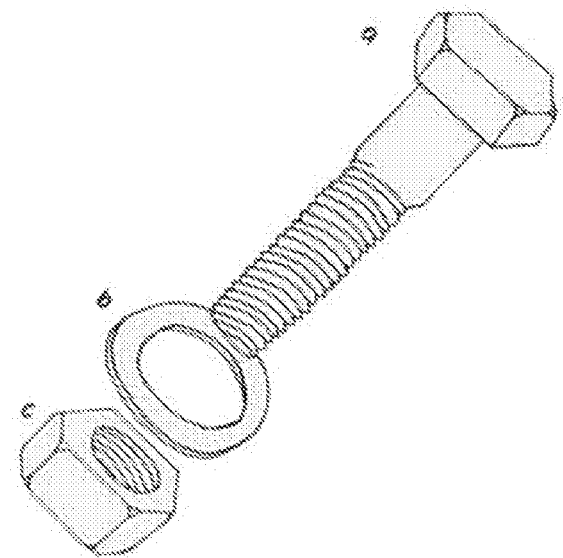
Figure 13B:
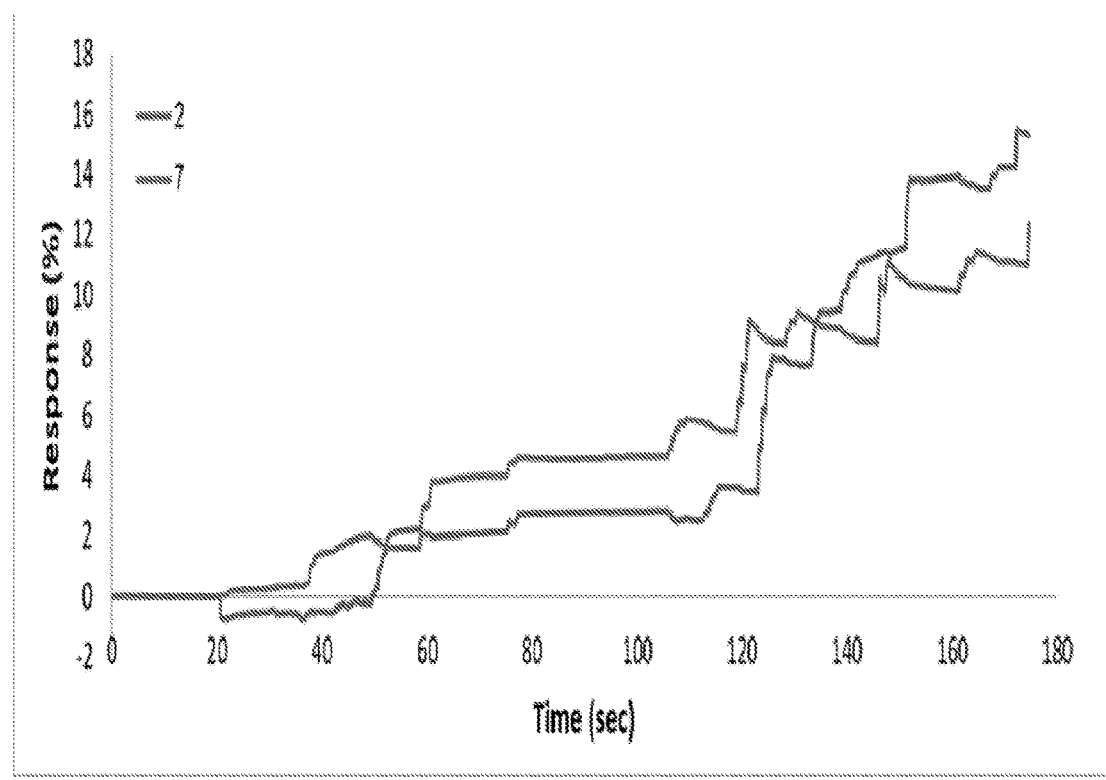
Figure 13D:
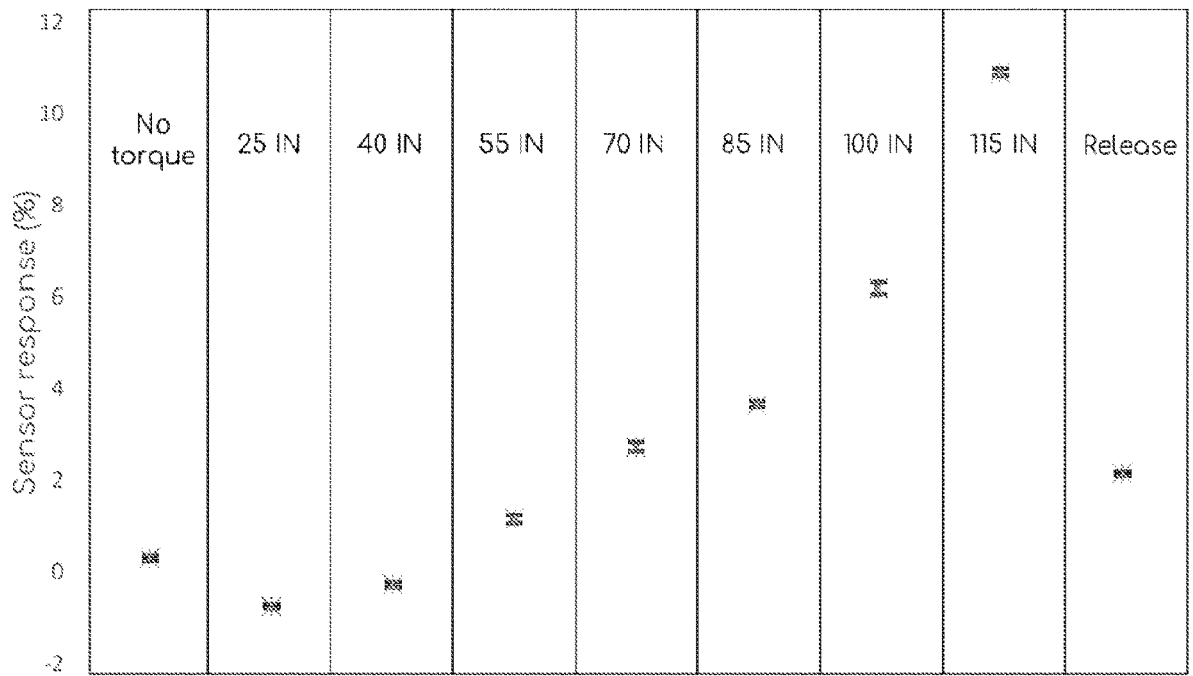

In FIGS. 13C and 13D, a nanoparticles based sensor was placed between the washer and a nut (131). Torque was applied and measured with a torque meter. As can be seen in FIG. 13D, the torque can be measured by the nanoparticles based sensor. Upon release, the sensor does not go back to its initial value due to plastic deformations and the high torque that was applied.

Figure 14:
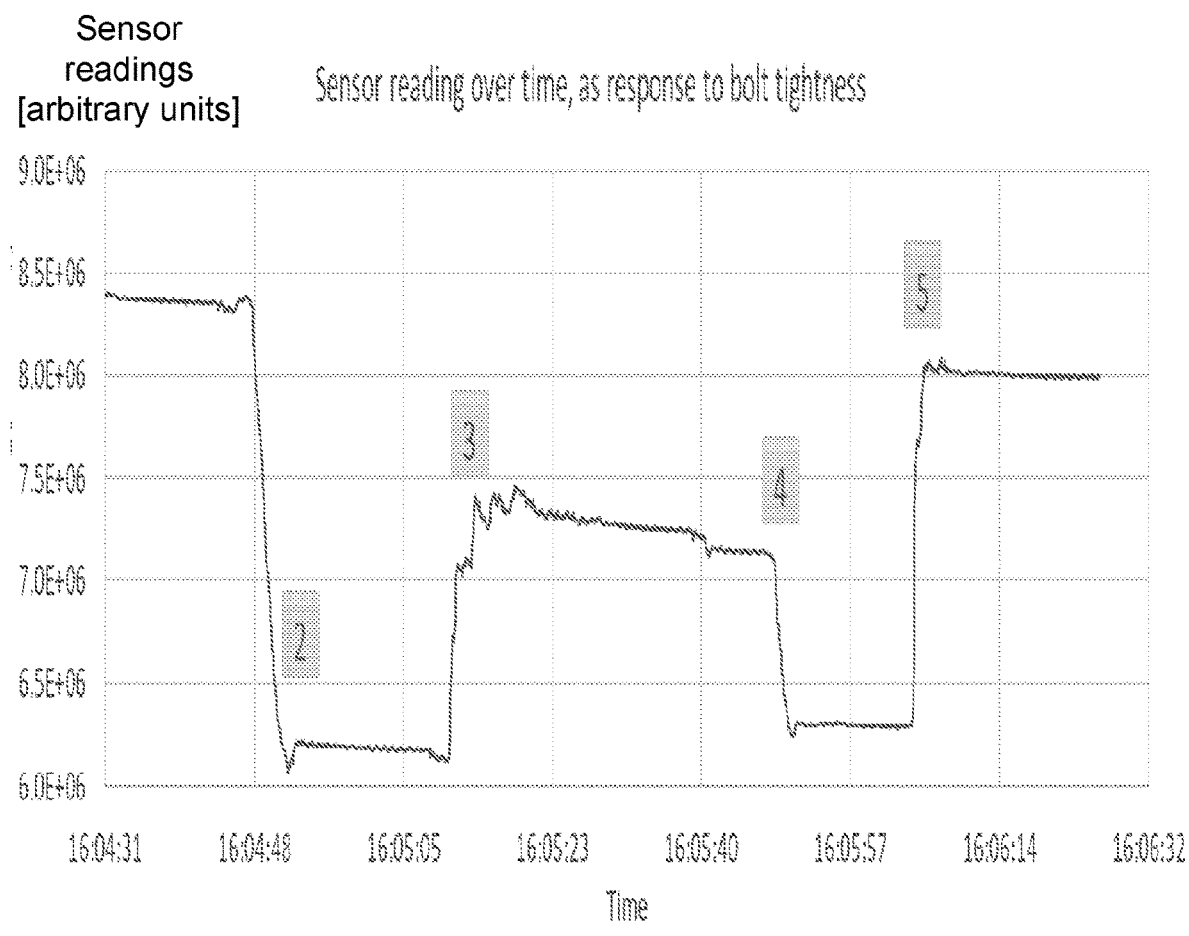

Using nanoparticles based sensors enables to monitor
  a. The tightening of the bolts (torque)
  b. The symmetry between bolts
  c. Bolts loosening To measure if nanoparticles based sensor can detect loosening of a tightened nut, caused by vibrations, the bolt, nut and washers were placed in a vise (see graph 140 of FIG. 14). The sensor was positioned between two washers. In order to create vibrations, we placed another bolt on the vise, and applied oscillated force on it using an electric drill. The nut with the sensor was tightened to 70 Nm using a torque meter and then we applied the vibrations for 60 seconds, and then retightened to 70 Nm. FIG. 14 shows the response of nanoparticles based sensor to loosening of the bolt due to the vibration applied nearby.

Specifically, Initial tightening to 70 [Nm], Applying vibrations, Nut loosening, Retightening to 70 [Nm], Completely releasing The sensor can monitor the loosening of the nut (3) after few seconds of vibrations, a change of 20% in the response. Loosening was reassured by retightened the nut (4). After completely releasing the nut at (5), we can see a change from the initial state (1). This probably happened due to repositioning of the sensor during the initial tightening or plastic deformations.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for determining a thickness parameter, the method comprises:
   measuring one or more resistances of one or more nanoparticle based sensing elements to provide sensed information; wherein the one or more nanoparticle based sensing elements comprise nanometric particles having an electrical resistance that is responsive to at least one out of pressure and temperature; wherein the one or more nanoparticle based sensing elements are printed between conductive electrodes, wherein the conductive electrodes are either printed on an area of an exterior of the fluid conduit or are formed on a substrate that is attached to the area;
   learning, during a learning period, a relationship between values of the sensed information and values of the thickness parameter;
   determining, based on the sensed information, the thickness parameter regarding a thickness of the area, wherein the determining of the thickness parameter is based at least in part on the relationship;
   after the learning period, calculating a first difference between maximal and minimal resistance values measured during a first period of time;
   calculating a second difference between maximal and minimal resistance values measured during a second period of time, the second period of time being later than the first period of time; and
   comparing the first difference to the second difference, wherein the determining of the thickness parameter is based at least in part on the comparison result.

2. The method according to claim 1 wherein the thickness parameter is indicative of at least one out of a thickness of the area, and a change in thickness of the area.

3. The method according to claim 2, comprising:
   receiving information about a relationship between values of the sensed information and values of the thickness related information, and
   wherein the determining of the thickness parameter is based on the relationship.

4. The method according to claim 2, wherein temperature and pressure conditions within the first and second periods of time are substantially equal to each other.

5. The method according to claim 4, wherein the determining of the thickness parameter comprises determining that the thickness of the area is reduced between the first and second time periods when the second difference exceeds the first difference.

6. The method according to claim 4, comprising estimating an occurrence of a future failure of the area based on a difference between the second difference and the first difference.

7. The method according to claim 1, wherein the nanometric piezoresistive particles are nanometric gold particles.

8. The method according to claim 1, comprising measuring resistances of multiple nanoparticle based sensing elements which form a three dimensional array of nanoparticle based sensing elements.

9. The method according to claim 1, wherein the one or more nanoparticle based sensing elements do not contact the fluid.

10. The method according to claim 1, wherein a thickness of the substrate is of tens of micrometer scale.

11. The method according to claim 1, comprising learning, during the learning period, a sensed information pattern that is indicative of a thickness parameter related event; wherein the determining of the thickness parameter related event comprises searching for the sensed information pattern and detecting an occurrence of the thickness parameter related event when finding the sensed information pattern.

12. A sensing device comprising a processor, one or more nanoparticle based sensing elements, conductive electrodes coupled between the processor and the one or more nanoparticle based sensing elements, wherein the sensing device is configured to:
(a) measure one or more resistances of the one or more nanoparticle based sensing elements to provide sensed information; wherein the one or more nanoparticle based sensing elements comprise nanometric particles having an electrical resistance that is responsive to at least one out of pressure and temperature; wherein the one or more nanoparticle based sensing elements are printed between the conductive electrodes, wherein the conductive electrodes are either printed on an area of an exterior of a fluid conduit or are formed on a substrate that is attached to the area;
(b) learn, during a learning period, a relationship between values of the sensed information and values of a thickness parameter;
(c) determine, based on the sensed information, the thickness parameter regarding a thickness of the area, wherein the determining of the thickness parameter is based at least in part on the relationship;
(d) after the learning period, calculating a first difference between maximal and minimal resistance values measured during a first period of time;
(e) calculating a second difference between maximal and minimal resistance values measured during a second period of time, the second period of time being later than the first period of time; and
(f) comparing the first difference to the second difference, wherein the determining of the thickness parameter is based at least in part on the comparison result.

* * * * *